M. M. McINTYRE.
VEHICLE SPRING.
APPLICATION FILED JUNE 24, 1915.
1,298,069.
Patented Mar. 25, 1919.
2 SHEETS—SHEET 1.
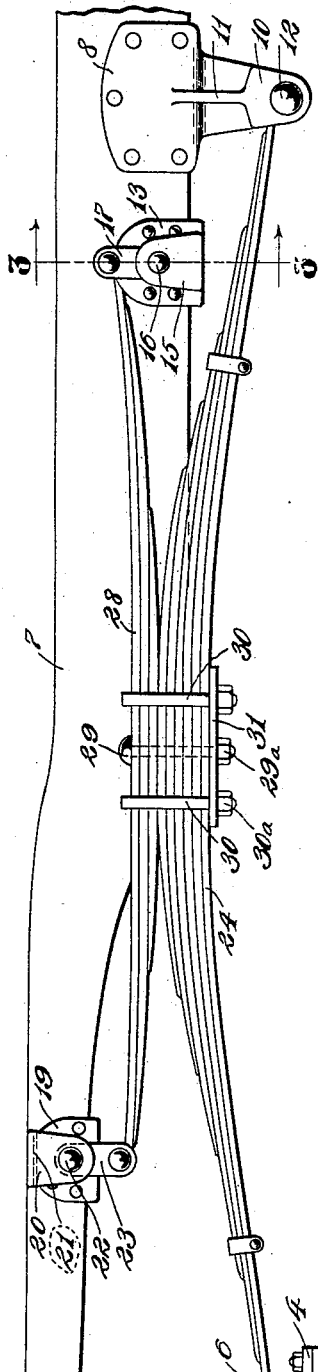
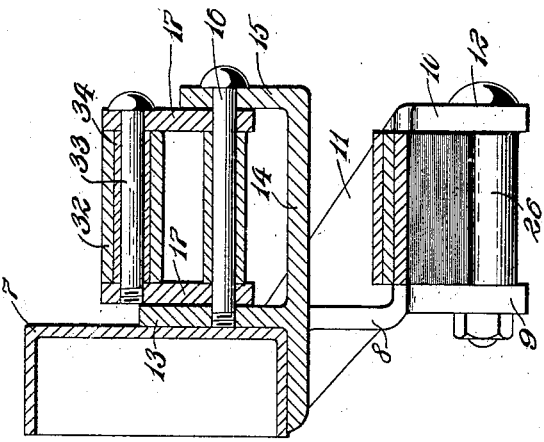
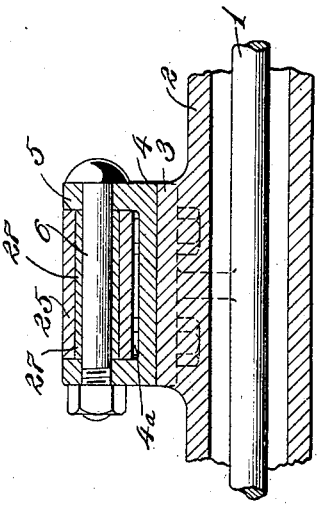
Inventor
Michael M. McIntyre,
By Hull, Smith, Brock & West
Attys M. M. McINTYRE.
VEHICLE SPRING.
APPLICATION FILED JUNE 24, 1915.

1,298,069.

Patented Mar. 25, 1919.
2 SHEETS—SHEET 2.

Inventor
Michael M. McIntyre,
By Hull, Smith, Brock & West
Attys.

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,298,069.　　　　　Specification of Letters Patent.　　Patented Mar. 25, 1919.

Application filed June 24, 1915. Serial No. 35,996.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs, and more particularly to springs of the cantaliver type wherein one end of the spring is connected to the axle and the opposite end and the body are connected to the frame. It is the general object of this invention to improve the operation and riding qualities of springs generally and more particularly of springs of the type referred to. The springs shown herein are related in general characteristics to those shown in my applications No. 749,865, filed Feb. 21, 1913 and No. 828,694, filed April 1, 1914.

Figure 4:
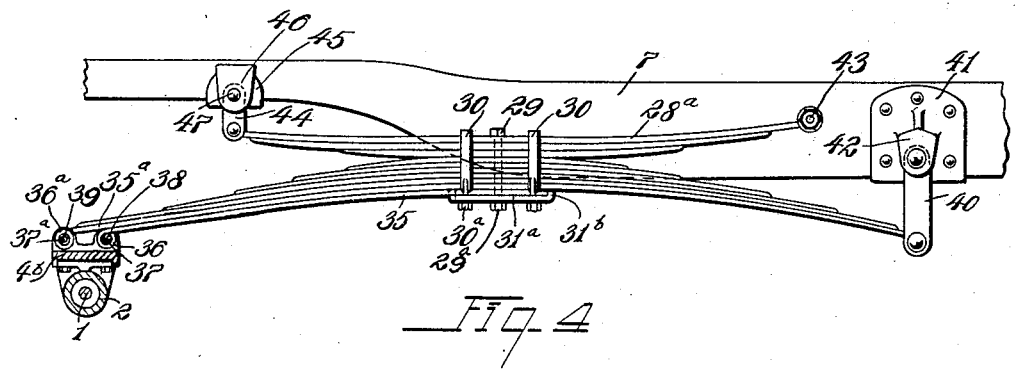
Figure 5:
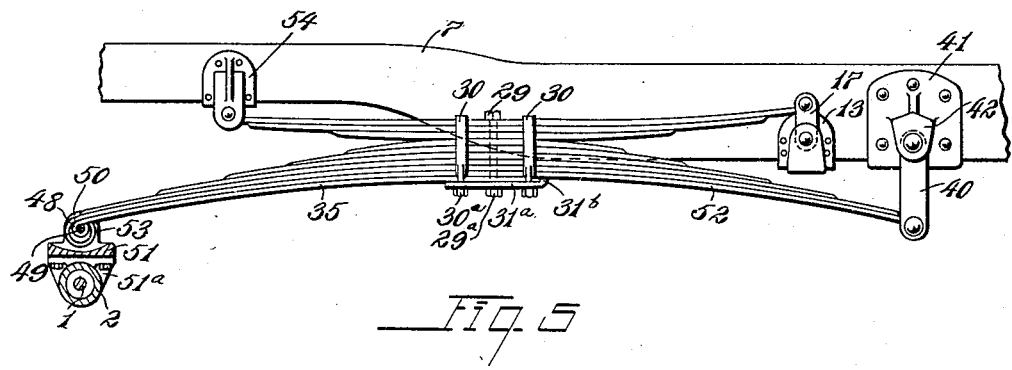
Figure 6:
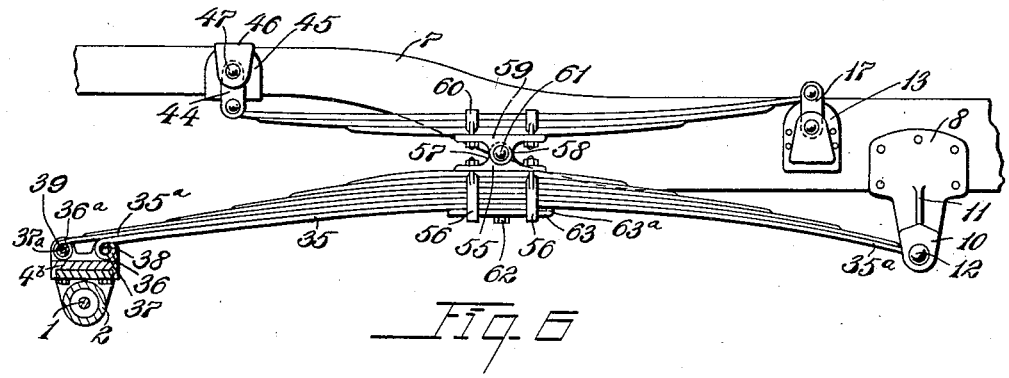

In the drawings forming part hereof, Figure 1 represents a side elevation (certain parts being shown in section) of a spring assembly constructed in accordance with my invention, the spring being shown as applied to a vehicle frame and axle; Figs. 2 and 3 are enlarged sectional views corresponding respectively to the lines 2—2 and 3—3 of Fig. 1; while Figs. 4, 5 and 6 are views, similar to Fig. 1, of modifications of my invention.

Describing the invention in detail, and with particular reference to Figs. 1 to 3 inclusive, 1 denotes the rear axle of an automobile and 2 the housing therefor, said housing being provided with the lower section 3 of a spring seat, preferably formed therewith. 4 denotes the upper section of the spring seat which is provided with a pair of upwardly extending lugs 5 adapted to receive the bolt 6 which extends through the eye of the main plate of the spring, to be described hereinafter. The upper and lower sections of the spring seat are shown as secured together by means of suitable bolts 4ᵃ.

7 denotes one of the side sills of an automobile, said sill being provided with a bracket 8 rigidly secured thereto, said bracket having a portion depending below the frame which carries one of the spring supporting lugs or ears 9, the other lug or ear 10 being carried at the lower end of the inclined rib 11 which projects from the bracket 8 and is rigid therewith. The lugs or ears 9 and 10 support the bolt 12 which extends through the eye at the end of the spring which is opposite that which is supported by the bolt 6. For convenience of description, it will be assumed that the axle 1 is the rear axle, and the terms "front" and "rear" will be applied accordingly, it being understood that I do not thereby preclude myself from using as front springs springs which embody more or less of the features of the springs shown herein.

13 denotes a bracket which is secured to the frame at the rear of the bracket 8 and which is provided with an outwardly projecting arm 14 at the bottom and an upwardly projecting lug or ear 15 at the outer end of this arm. A pin 16 is supported by the lug 15 and the body of the bracket and this pin in turn supports a pair of upwardly extending shackle links 17 to which the front end of an auxiliary spring—to be described hereinafter—is connected.

19 denotes a bracket similar to the bracket 13 but having the lug 20 extending downwardly instead of upwardly from the connecting web or leg, indicated in dotted lines at 21. This bracket and the lug 20 support a pin 22 from which a pair of shackle links 23 depend, the rear end of the auxiliary spring being connected in turn to these links.

24 denotes the main plate of the main spring. This plate is provided with an eye 25 at the rear end through which the bolt 6 extends and with an eye 26 at the front end through which the bolt 12 extends. A bushing 27 may be provided for each of the eyes. The main spring comprises, in addition to the main plate 24, a plurality of auxiliary plates, the spring being in shape a semi-elliptic spring. To the back of this spring there is connected an auxiliary spring comprising the main plate 28 and a plurality of auxiliary plates, two such auxiliary plates being shown. The main and auxiliary springs are connected together back-to-back, as by means of a center bolt 29 and clips 30, said clips being of usual shape and extending around the two springs having their lower ends projecting through a plate 31 which may bear against the main plate of the main spring; the lower ends of the bolts and clips are threaded and provided with nuts indicated at 29ª and 30ª. The front end of the main plate 28 of the auxiliary spring is provided with an eye 32 which is connected to the shackle links 17 by means of the bolt 33. A bushing 34 is shown as surrounding said pin. The rear end of the plate 28 is also provided with an eye similar to the eye 34 and similarly connected to the depending shackle links 23.

With this construction, it will be observed that the drive will be from the axle through the main spring to the frame 7 by means of the bracket 8. As any deflection of the spring tending to flatten the same will result in no forward movement of the center of the spring, but rather the reverse, the rear end of the auxiliary spring cannot move upwardly so as to invert the shackle links 23. As any movement of the axle downwardly, thereby to increase the curvature of the main spring, cannot impart any material longitudinal movement to the auxiliary spring, it follows that the shackles 17 will not be inverted by such movement.

The auxiliary spring cushions the blows which would be otherwise transmitted to the frame by the movement of the axle and the frame toward each other and yieldingly resists the separation of the axle and frame on rebound.

In Fig. 4 there is shown a modification of the invention wherein the same general arrangement of main and auxiliary springs is provided but with different connections between the ends of the main spring and the axle and frame and between the front end of the auxiliary spring and the frame. In this case, the bottom plate 35 of the main spring extends a short distance beyond the connection between the main and auxiliary springs and is provided with an eye 36 which is connected to the upper part 4$^b$ of the spring seat by means of a pin 37 extending through the opposite sides of said seat and through an eccentric bushing 38 which substantially sizes the eye. The main plate 35ª is extended beyond the bottom plate 35 and is provided with an eye 36ª which is secured to the rear portion of the spring seat member 4$^b$ by means of a pin 37ª and a bushing 39. It will be observed that the points of connection between the rear end of the spring and the spring seat are spaced longitudinally, or in the direction of the length of the spring, and that the connection for the plate 35 is in front of the connection for the plate 35ª. This affords accommodation for the rear parts of the plates 35 and 35ª, while the bushing 38 accommodates the relative longitudinal movement between such plates due to the deflection of the spring. It will be noted also that the plate 35$^b$ extends beyond or rearwardly of the plate 35.

The front end of the plate 35ª is provided with an eye whereby it may be connected to the shackle links 40 in the usual manner, said shackle links being supported by the bracket 41 which may be similar in construction to the bracket 8, the lug 42 being located above the bottom of the frame instead of below, as is the case with the lug 10 of the bracket 8. The auxiliary spring is substantially identical with that of Fig. 1 and is shown as comprising three plates (although any suitable number may be employed) with the main plate 28ª uppermost, the auxiliary spring and the main spring being placed back-to-back and being secured by means of the center bolt 29 and clips 30 shown as constructed in substantially the same manner as the parts having like numerals on Fig. 1. The plate 31ª through which the clips 30 and the bolt 29 extend differs from the plate 31 of Fig. 1 in having its front end turned up, as shown at 31$^b$, thereby forming an abutment for the front end of the plate 35.

The front end of the auxiliary spring is connected to a bolt or pin 43 secured to the side frame 7 while the rear end of said auxiliary spring is connected in the usual manner to a pair of shackle links 44 depending from the bracket 45 and shown as similar to the bracket 19 of Fig. 1, 46 denoting the lug or ear corresponding to the lug or ear 20 on Fig. 1 and 47 denoting the bolt to which the upper ends of the shackle links are pivoted.

In the operation of the spring shown in Fig. 4, the vehicle is driven through the plates 35, 35ª and the front end of the auxiliary spring, which is rigidly connected to the frame 7. Any movement of the axle toward the frame will be cushioned by the joint action of the main and auxiliary springs, the shackles 40 and 44 having no tendency to become inverted. Any movement of the axle away from the frame will be resisted by both parts of the auxiliary spring as well as by the main spring.

In Fig. 5 there is shown a still further modification of the invention. In this view, the bottom plate 35 of the main spring is provided with an eye 48 which is secured in the usual manner to a pin 49 extending through a pair of opposed lugs on the upper section 51 of the spring seat, the lower section whereof is indicated at 51ª. The front end of the plate 35 is constructed and arranged in the same manner as the front end of the correspondingly designated plate in Fig. 4. The main plate 52 is provided with an enlarged eye 53 which is shown as extending around the eye on the bottom plate and which has an internal diameter considerably in excess of the external diameter of the eye 48, whereby relative longitudinal movement between this plate and the main plate will be compensated for. The opposite end of the main plate is connected to the frame in the same manner as the like designated parts on Fig. 4.

The auxiliary spring in this case is similar to the spring shown in Figs. 1 and 4 and is connected to the main spring in the same manner as shown in said figures. The front end of the auxiliary spring is connected to a pair of shackle links 17 which project upwardly from a bracket 13 shown as similar to the correspondingly numbered bracket of Fig. 1. The rear end is connected rigidly to a bracket 54 which is secured to the sill 7, the bracket being shown as similar to the bracket 45, 46.

Referring now to the spring shown in Fig. 5, the drive will take place through the plate 35 back to the rear end of the auxiliary spring and through the frame to which such rear end is rigidly connected. When the axle is moved toward the frame, the shock or blow will be cushioned through the main and the auxiliary spring while the separation of the axle will be resisted by the main spring and the auxiliary spring, the shackles 17 allowing the necessary movement of the auxiliary spring to accommodate the elongation and contraction thereof.

In Fig. 6 there is shown a still further modification of my invention, wherein the bottom plate 35 and the main plate 35ª are shown as connected to the upper spring seat section 4ᵇ in the same manner as the corresponding parts of the main spring of Fig. 4, the parts which are substantially identical in Figs. 4 and 6 being designated by the same reference characters. The front end of the main plate is rigidly connected to a bracket which is substantially identical with the corresponding bracket in Fig. 1 and which is identified by like numerals.

The main and auxiliary springs are pivotally connected, and for this purpose the plate 55 through which the ends of the clips 56 extend is provided with a lug 57 which is adapted to fit between a pair of lugs or depending ears 58 on a plate 59 secured to the auxiliary spring by means of the clips 60. The pivotal connection between said clip plates is effected by means of the bolt 61. A center bolt 62 may be employed for the main spring. The bottoms of the clips 56 extend around the plate 63, corresponding to the plate 31ª and having a projection 63¹ adapted to engage the front end of the plate 35. The front end of the auxiliary spring is connected to a pair of shackle links 17 which may be supported from the frame 7 by means of a bracket 13, the parts 13 and 17 being shown as substantially identical with the like designated parts in Figs. 1 and 5. The rear end of the auxiliary spring is supported by a pair of shackle links 44 which may be carried by a bracket 45, 46 by means of a bolt 47, the parts being shown as substantially identical with the like designated parts in Fig. 4.

In the construction shown in Fig. 6, the drive will be through the plates 35 and 35ª to the bracket 8, while the auxiliary spring will operate in a similar manner to the auxiliary spring shown in Fig. 1, with the added feature that the auxiliary spring in Fig. 6 has a rocking connection with the main spring. With the construction shown in Figs. 4 and 6, driving is effected by means of two plates instead of one, while provision is made for accommodating the creeping or relative movement between the driving plates. In all the forms of my invention, the arrangement of the connections is such that the auxiliary spring is substantially straight or horizontal, notwithstanding the drop in the frame.

It will be observed that in all forms of my invention one end of the main cantaliver spring is connected to the axle and the other end to the frame. As these springs are ordinarily used, the rear end of the frame has a long unsupported overhang whereby a frame of ordinary strength is liable to be bent or broken through the weight and leverage exerted upon the point of connection between the spring and the frame. My invention permits the use of cantaliver springs without subjecting the frames to this severe strain; in fact, because of the manner of connecting the cantaliver spring to the frame—through the longitudinally spaced ends of the auxiliary spring—the auxiliary spring acts in some respects as a subframe the opposite ends whereof are connected to the main frame and enables me to use a lighter frame than heretofore considered necessary. Instead of using a spring as the connecting means between the main cantaliver spring and the frame, I may use a rigid member—especially in the case of trucks and other heavy vehicles—the auxiliary member (whether a spring or a rigid member) serving to break the fulcrum between the main spring and the frame and to make the connection at two longitudinally separated points.

Having thus described my invention, what I claim is:—

1. The combination, with a vehicle body frame and axle, of a spring comprising a main plate and one or more plates additional thereto, one of such additional plates being located below the main plate and the main plate extending beyond such additional plate, means connecting the ends of the last two plates to the axle, means connecting the central portion of the spring to the frame, and means connecting the opposite end of the spring to the frame.

2. The combination, with a vehicle body frame and axle, of a spring comprising a main plate and one or more plates additional thereto, one of such additional plates being located below the main plate and having one end thereof terminating short of the adjacent end of the main plate, means connecting the ends of the two last mentioned plates to the axle, means connecting the opposite end of said spring to the frame, and a connection between the body portion of the spring and the frame.

3. The combination, with a vehicle body frame and axle, of a spring comprising a main plate and one or more plates additional thereto, one end of the main plate extending beyond the corresponding end of one of the additional plates, means connecting such ends of the last two plates to the axle at longitudinally spaced intervals, one of such connections being a yielding connection, and means connecting the opposite end of the spring to the frame.

4. The combination, with a vehicle body frame and axle, of a spring comprising a main plate and one or more plates additional thereto, one end of the main plate extending beyond the corresponding end of one of the additional plates, means connecting such ends of the last two plates to the axle at longitudinally spaced intervals, one of such connections being a yielding connection, means connecting the opposite end of the spring to the frame, and means connecting the body portion of the spring to the frame.

5. The combination, with a vehicle body frame and axle, of a spring comprising a main plate and one or more plates additional thereto, one end of the main plate extending beyond the corresponding end of one of such additional plates, means connecting such ends of the last two plates to the axle, the connection between the additional plate and the axle being a yielding connection, a rigid connection between the opposite end of such additional plate and the body of the spring, and a driving connection between said spring and the frame.

6. The combination, with a vehicle body frame and axle, of a spring comprising a plurality of plates, two of said plates being provided with eyes, means connecting said eyes to the axle at longitudinally spaced intervals, one of such connections being a yielding connection, means connecting the opposite end of the spring to the frame, an auxiliary spring also connected to the frame, and means connecting the auxiliary spring to the body of the first mentioned spring.

7. The combination, with a vehicle body frame and axle, of a spring comprising a plurality of plates, two of said plates being provided with eyes, means connecting said eyes to the axle, one of such connections being a yielding connection, means connecting the opposite end of the spring to the frame, an auxiliary spring also connected to the frame, and means connecting the auxiliary spring to the body of the first mentioned spring.

8. The combination, with a vehicle body frame and axle, of a spring comprising a plurality of leaves, two of said leaves being provided with longitudinally spaced eyes, means for connecting such eyes to the axle, means connecting the opposite end of the spring to the frame, an auxiliary spring also connected to the frame, and a pivotal connection between the first mentioned spring and the auxiliary spring.

9. The combination, with a vehicle body frame and axle, of a spring comprising a plurality of leaves, two of said leaves being provided with eyes, means for connecting such eyes to the axle, one of such connections being a yielding connection, means connecting the opposite end of the spring to the frame, an auxiliary spring also connected to the frame, and a pivotal connection between the first mentioned spring and the auxiliary spring.

10. The combination, with a vehicle body frame and axle, of a main spring, means connecting one end of the main spring to the axle, a rigid connection between the opposite end of the main spring and the frame, an auxiliary spring secured to the body of the main spring, downwardly extending shackles connecting the rear end of the auxiliary spring to the frame, and upwardly extending shackles connecting the front end of the auxiliary spring to the frame.

11. The combination, with a vehicle body frame and axle, of a spring comprising a main plate and one or more plates additional thereto, the main plate and one of such additional plates having each an eye at corresponding ends thereof, means connecting both eyes to the axle, a connection between the opposite end of the spring and the frame, an auxiliary spring connected to said frame, and means connecting said springs.

12. The combination, with a vehicle body frame and axle, of a main spring, means connecting longitudinally spaced portions of one end of said spring to the axle, a driving connection between the opposite end of said spring and the frame, an auxiliary spring connected to the main spring, an upwardly projecting shackle connecting the front end of said auxiliary spring to the frame, and a downwardly extending shackle connecting the rear end of the auxiliary spring to the frame.

13. The combination, with a vehicle body frame and axle, of a main spring, means connecting longitudinally spaced portions of one end of said spring to the axle, a driving connection between the opposite end of said spring and the frame, an auxiliary spring having a pivotal connection with the main spring, an upwardly projecting shackle connecting one end of said auxiliary spring to the frame, and a downwardly extending shackle connecting the rear end of the auxiliary spring to the frame.

14. The combination, with a vehicle body frame and axle, of a main spring comprising a main plate and one or more plates additional thereto, one end of the main plate extending beyond the corresponding end of one of the additional plates, means separately connecting such ends of the last two plates to the axle at longitudinally spaced intervals, means connecting the opposite end of the said spring to the frame, an auxiliary spring pivotally connected to the main spring, and means connecting the opposite ends of said auxiliary spring to the frame.

15. The combination, with a vehicle body frame and axle, of a main spring comprising a main plate and one or more plates additional thereto, one end of the main plate extending beyond the corresponding end of one of the additional plates, means connecting such ends of the last two plates to the axle at longitudinally spaced intervals, one of such connections being a yielding connection, means connecting the opposite end of the spring to the frame, an auxiliary spring pivotally connected to the main spring, an upwardly projecting shackle connecting the front end of said auxiliary spring to the frame, and a downwardly extending shackle connecting the rear end of the auxiliary spring to the frame.

In testimony whereof, I hereunto affix my signature in the presence of two witnesses.

MICHAEL M. McINTYRE.

Witnesses:
J. B. HULL,
H. E. FIGGIE.

Copies of this patent may be obtained for five cents each, by addressing the "Commissioner of Patents, Washington, D. C."